United States Patent [19]

Masui et al.

[11] Patent Number: 5,154,872
[45] Date of Patent: Oct. 13, 1992

[54] PROCESS FOR PRODUCING A MULTILAYER MOLDED ARTICLE

[75] Inventors: Syohei Masui, Sorak; Nobuhiro Usui, Takatsuki; Masahito Matsumoto, Ibaraki, all of Japan

[73] Assignee: Sumitomo Chemical Company, Limited, Osaka, Japan

[21] Appl. No.: 700,936

[22] Filed: May 13, 1991

Related U.S. Application Data

[63] Continuation of Ser. No. 324,081, Mar. 16, 1989, abandoned.

[30] Foreign Application Priority Data

Mar. 16, 1988 [JP] Japan ................... 63-64179

[51] Int. Cl.⁵ .................................... B29C 43/18
[52] U.S. Cl. ................................ 264/266; 264/295
[58] Field of Search ............ 264/257, 259, 266, 295, 264/296, 320, 324

[56] References Cited

U.S. PATENT DOCUMENTS

| | | |
|---|---|---|
| 2,938,232 | 5/1960 | Martin . |
| 5,034,076 | 7/1991 | Masui et al. .................. 264/257 X |

FOREIGN PATENT DOCUMENTS

| | | |
|---|---|---|
| 206100 | 12/1986 | European Pat. Off. . |
| 249939 | 12/1987 | European Pat. Off. ............ 264/259 |
| 59-150740 | 8/1984 | Japan . |
| 60-212312 | 10/1985 | Japan . |
| 61-137713 | 6/1986 | Japan .................. 264/259 |
| 63-135221 | 6/1988 | Japan . |
| 2193681 | 2/1988 | United Kingdom . |

OTHER PUBLICATIONS

English-Language Translation of Japan 61-137,713 (published Jun. 25, 1986).
*Encyclopedia of Polymer Science and Technology*, p. 436 (undated).

Primary Examiner—Leo B. Tentoni
Attorney, Agent, or Firm—Birch, Stewart, Kolasch & Birch

[57] ABSTRACT

A multilayer molded article includes a resin body and skin material with good quality and is produced by a process which includes the steps of: (a) supplying a skin material between a male mold and a female mold which are attached to a clamping mechanism, (b) starting closing of the male and female molds, and supplying a resin melt for the resin body between the skin material and the male or female mold while temporarily stopping the closing action of the mold or adjusting a closing rate at 30 mm/sec. or less when a cavity clearance between the molds is in the range between (C+100) mm and (C+5) mm (wherein C is the cavity clearance when the molding is finished), and (c) further closing the molds to the cavity clearance of C to finish the molding.

12 Claims, 2 Drawing Sheets

PROCESS FOR PRODUCING A MULTILAYER MOLDED ARTICLE

This application is a continuation of application Ser. No. 07/324,081 filed on Mar. 16, 1989 now abandoned.

BACKGROUND OF THE INVENTION

1. Field of the Invention

The present invention relates to a process for producing a multilayer molded article. More particularly, the present invention relates to a process for producing a multilayer molded article comprising a resin body and a skin material.

2. Description of the Related Art

A multilayer molded article comprising a resin body and a skin material is widely used in many products including automobiles and household electric appliances, since such an article is economical and light and has good moldability and surface properties so that is used for decoration and feels soft.

As a method for producing the multilayer molded article, Japanese Patent Kokai Publication No. 150740/1984 proposes a method in which a peripheral part of a skin material is sandwiched between a flame for fixing the skin material and a female mold, which flame is movably attached to the female mold or a male mold and has an opening through which the male mold can pass, then, a resin melt is supplied between the skin material and the male or female mold, and finally the molds are closed to complete molding.

The conventional method does not necessarily produce a multilayer molded article having a good feeling, for example having no unevenness, no debossing or no fiber lying on the skin material, although it can produce a multilayer article having neither wrinkles nor breakage of the skin material.

SUMMARY OF THE INVENTION

An object of the present invention is to provide a process for producing a multilayer molded article comprising a resin body and a skin material and having good feeling.

Accordingly, the present invention provides a process for producing a multilayer molded article comprising a resin body and a skin material, which method comprises the steps of:

(a) supplying a skin material between a male mold and a female mold which are attached to clamping means, (b) starting closing of the male and female molds, and supplying a resin melt for the resin body between the skin material and the male or female mold while temporarily stopping the closing action of the mold or adjusting a closing rate at 30 mm/sec. or less when a cavity clearance between the molds is in the range between (C + 100) mm and (C + 5) mm (wherein C is the cavity clearance when the molding is finished), and (c) further closing the molds to the cavity clearance of C to finish the molding.

The process of the present invention is based on the finding that the conditions for supplying the resin melt are very important in the production of the multilayer molded article with good quality.

In the context of the present invention, the "male mold" is intended to mean a mold an outer surface of which faces an inner wall of the other mold, and the "female mold" is intended to mean a mold an inner wall of which faces the outer surface of the other mold, when two molds are closed.

DETAILED DESCRIPTION OF THE DRAWINGS

Figure 1:
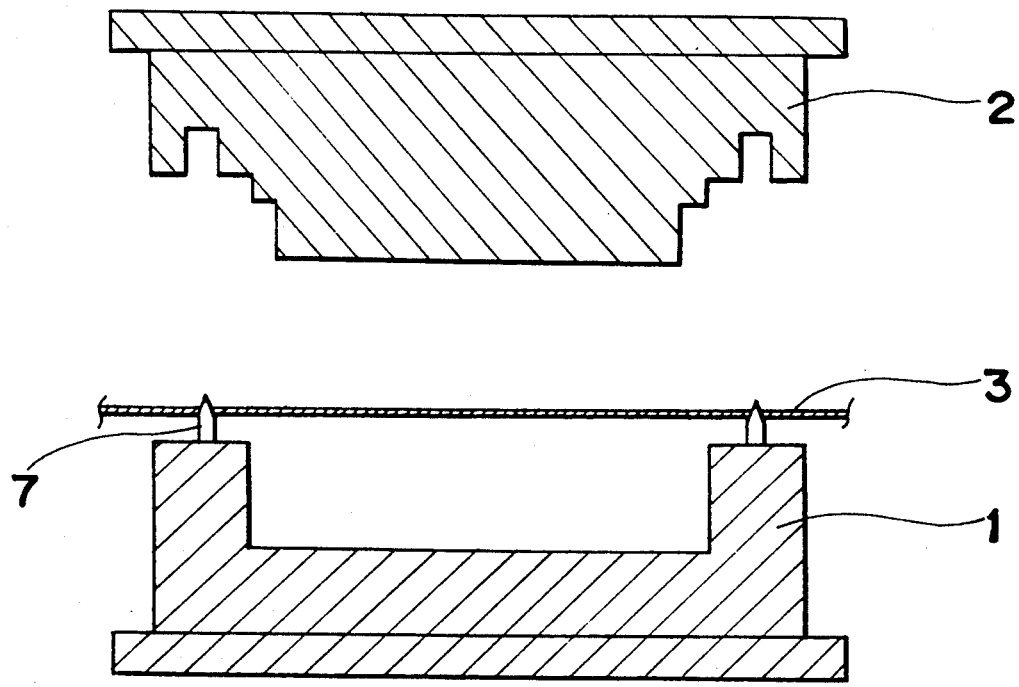
FIGS. 1 to 4 are cross sectional views of the molds for producing the multilayer molded article according to the present invention in various steps.

Now, the process of the present invention will be illustrated by way of example by making reference to the accompanied drawings.

One of the typical molding apparatuses shown in the drawings comprises a clamping mechanism having an upper platen (not shown) which is vertically moved with a lifting mechanism (not shown) and a fixed lower platen (not shown), a female mold 1 attached to the lower platen, a male mold 2 attached to the upper platen, means (not shown) for supplying a resin melt 4 between a skin material 3 and the male mold 2 or the female mold 1 and other auxiliary equipments.

The process of the present invention is carried out by the use of such apparatus as follows:

First step

The skin material 3 in the form of a continuous sheet or a cut-off form is supplied between the female mold 1 and the male mold 2 which are attached to the vertically movable clamping mechanism (FIG. 1).

Figure 2:
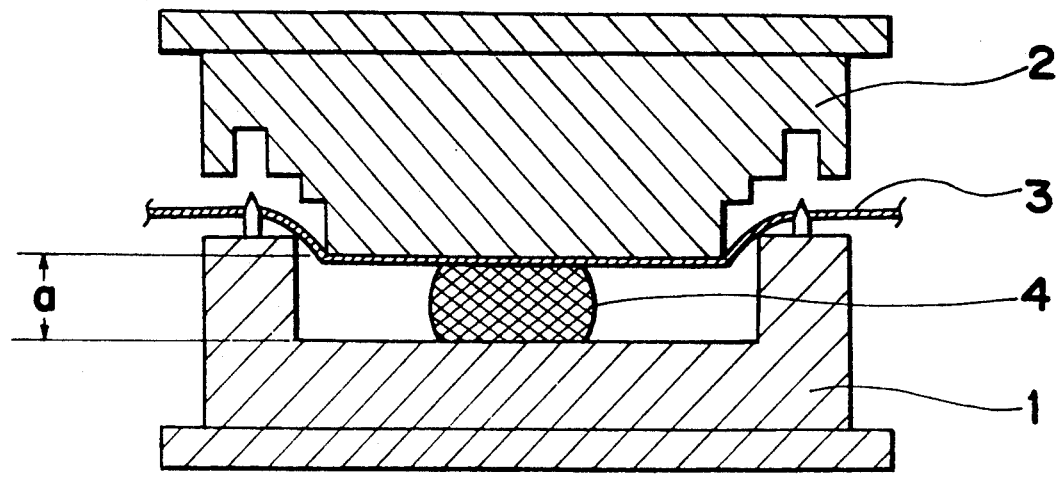
Figure 3:
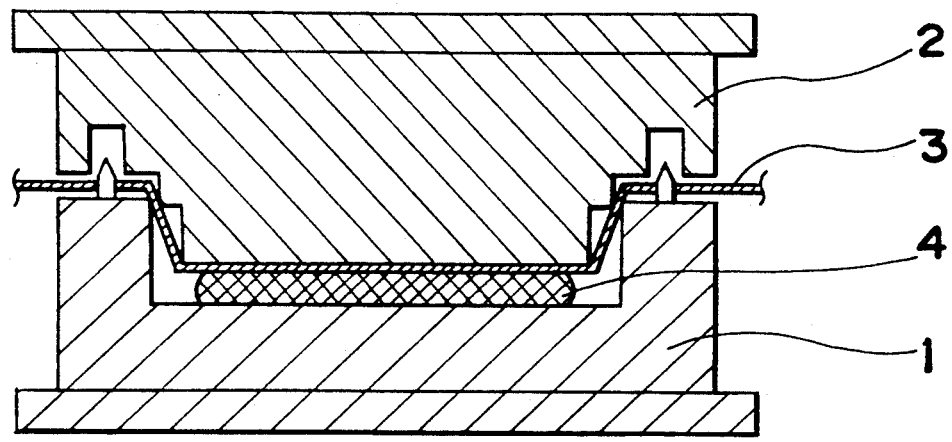

Second step (b) The closing of the male mold 2 and female mold 1 is started by lowering the male mold 2. The resin melt 4 for the resin body is supplied between the skin material 3 and the female mold 1 through a resin melt passage provided in the female mold 1 while temporarily stopping the closing action of the mold or adjusting a closing rate at 30 mm/sec. or less when the cavity clearance between the molds is in the range between (C + 100) mm and (C + 5) mm (wherein C is the cavity clearance when the molding is finished) (FIG. 2).

Third step

Figure 4:
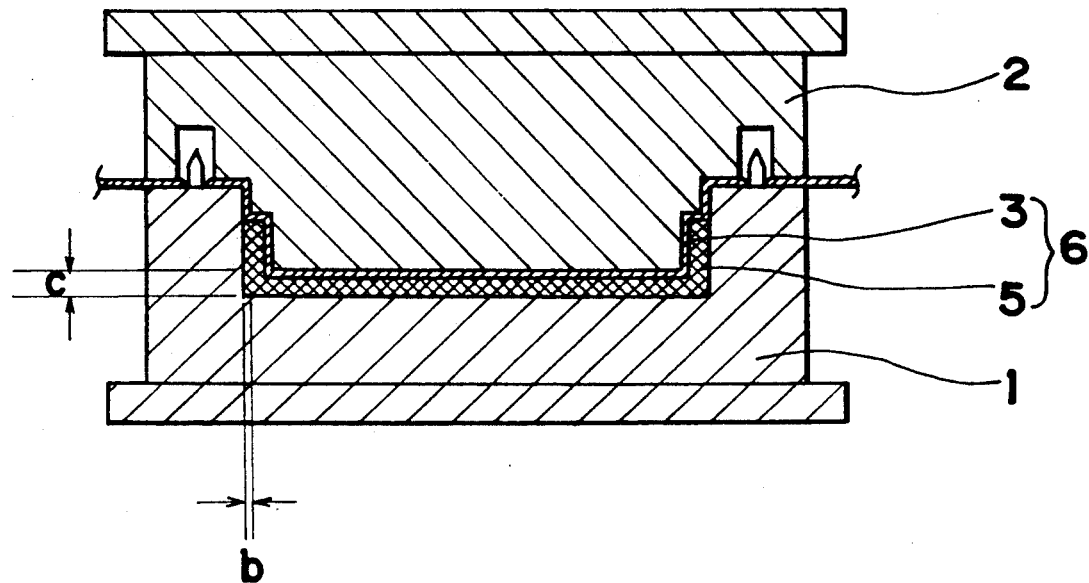

Then, the male mold 2 is further lowered till the cavity clearance reaches C to finish the molding of the multilayer molded article having the skin material 3 which is integrally attached to the resin body 5 (FIG. 4).

The cavity clearance C is the clearance between the male and female molds when the molding is finished. Since the skin material is compressed in the mold when the cle is removed from the molds, the cavity clearance C is sometimes different from the thickness of the multilayer molded article removed from the molds. When the skin material is made of a foam material, it recovers greatly.

In the second step, the resin melt is supplied when the cavity clearance is in the range between (C + 100) mm and (C + 5) mm. When the cavity clearance is larger than (C + 100) mm, the surface of the supplied resin melt mass is cooled and freely shrinks to easily from the uneven surface. Then, the uneven surface of the resin body is transferred to the skin material to generate unevenness on the surface of the skin material. When the cavity clearance is smaller than (C + 5) mm, excessive heat and resin pressure are applied to a part of the mold near the resin melt feed opening, so that, at a part of the skin material positioned near said feed opening, depression or unevenness is formed, the fibers lie down, or debossing is caused. Preferably, the resin melt is supplied when the cavity clearance is in the range between (C + 100) mm and (C + 10) mm.

In the process of the present invention, the resin melt is supplied between the skin material and the male mold or the female mold with strictly adjusting the cavity clearance in the range between (C + 100) mm and (C + 5) mm while temporarily stopping the closing action of the mold or adjusting the closing rate to 30 mm/sec. or less. When the resin melt is supplied under the above conditions, the subsequently supplied resin melt, namely the uncooled melt is spread outwardly as if it were squeezed out, whereby the concentration of heat at the part near the resin melt feed opening is avoided and, in turn, the feeling of the skin material is maintained.

When the mold closing rate of the molds is larger than 30 mm/sec., the excess pressure is applied to the skin material near the resin melt feed opening, so that the feeling of the skin material tends to be deteriorated. Preferably, the mold closing rate is from 0.1 to 20 mm/sec., particularly when the skin material comprising the foam which is easily damaged by heat or resin pressure.

When the resin melt is supplied while the mold closing is temporarily stopped in the second step, the mold closing is restarted before or after the resin supply is finished or at the moment when the resin supply is finished. Preferably, the mold closing is restarted before the resin supply is finished or at the moment when the resin supply is finished.

As the resin to be molded by the process of the present invention, any of the conventional resins used in compression molding, injection molding and extrusion molding can be used. Specific examples of the resin are non-expandable or expandable resins of thermoplastic resins (e.g. polypropylene, polyethylene, polystyrene, acrylonitrilestyrene-butadiene copolymer, nylon, etc.), and thermoplastic elastomers (e.g. ethylene-propylene copolymer, styrenebutadiene copolymer, etc.). The resin may contain at least one additive such as fillers (e.g. inorganic fillers and glass fibers), pigments, lubricants, antistatic agents and the like.

Specific examples of the skin material are woven or non-woven fabric, nets made of metals, fibers or thermoplastic resins, paper, metal foils, and a sheet or a film of a thermoplastic resin or elastomer. The skin material may be decorated with uneven patterns such as grain patterns, printing, dying and the like. In addition, the skin material may be made of foamed materials of thermoplastic resins (e.g. polyolefins, polyvinyl chloride, polystyrene, etc.), thermosetting resins (e.g. polyurethane, etc.) and rubbers (e.g. cis-1,4-polybutadiene, ethylene-propylene copolymer, etc.). Also, a laminate comprising at least two layers each made of the same material or different materials which are bonded to each other with an adhesive can be used as the skin material. Before the skin material is supplied in the mold, a part or whole of the skin material may be preheated to adjust tensile stress and elongation.

The relative position of the male and female molds and/or the closing direction can be freely selected. The resin melt may be supplied from the male mold side or the female mold side.

The skin material can be supported with supporting means which is arranged outside the mold, or with setting pins 7 provided on the top edge of the mold (see FIG. 1) or a cramping mechanism. Depending on the shape of the molded article, the skin material may be simply placed on the lower mold. In this case, the force supporting the skin material is controlled by adjusting a shear clearance (b) between the male and female molds to about 0.1 to 1.0 mm (see FIG. 4).

Since the conditions for supplying the resin melt in the mold and for closing the mold are strictly controlled in the process of the present invention, excessive heat and resin pressure are not partially applied to the skin material near the resin melt feed opening, and the resin melt is uniformly contacted directly to the mold surface or the mold surface through the skin material. The process of the present invention is useful particularly when the skin material comprises the foamed plastic material which is easily influenced by the excessive heat or resin pressure.

Accordingly, the process of the present invention can constantly produce the multilayer molded article having good feeling.

PREFERRED EMBODIMENTS OF THE INVENTION

Practically and presently preferred embodiments of the present invention will be illustrated by following examples.

EXAMPLE 1

As the body resin, polypropylene (Sumitomo Noblen (trade mark) AZ564, manufactured by Sumitomo Chemical Co., Ltd.) was used. As the skin material, a laminate of raised tricot (TR #109 having a thickness of 2.0 mm, manufactured by Kawashima Fabric, Co., Ltd.) and a sheet of polypropylene foam having an expansion ratio of 15 and a thickness of 3 mm (the total thickness of of the skin material being 4.6 mm) was used.

According to the process described above by making reference to FIGS. 1 to 4, a box article having a length of mm, a width of 250 mm and a height of 40 mm was produced from the laminated material consisting of the resin body layer having a thickness of 2.5 mm and the skin material layer having a thickness of 4.3 mm under the following conditions:

| Conditions for supplying the resin melt | |
|---|---|
| Resin temperature: | 240° C. |
| Mold temperature: | 35° C. |
| Cavity clearance: | |
| at the start of resin supply: | 63 mm |
| at the end of resin supply: | 43 mm |
| Mold closing rate: | 10 mm/sec. |
| Cavity clearance on the completion of molding | |
| | 3.0 mm |

The skin material had no breakage or wrinkle, the raised fibers did not lie, and the surface of the article was smooth.

COMPARATIVE EXAMPLE 1

In the same manner as in Example 1 but changing the cavity clearance and the mold closing rate as follows, the box article was produced:
  Cavity clearance:
    at the start of resin supply: 34 mm
    at the end of resin supply: 6 mm (= C + 3)
  Mold closing rate: 14 mm/sec.

The molded article had a dent near the resin melt feed opening, and the part around such dent was uneven.

EXAMPLE 2

As the body resin, an ABS resin (Kralastick (trade mark) MTH-2, manufactured by Sumitomo Naugauck Co., Ltd.) was used. As the skin material, a laminate of a polyvinyl chloride sheet with grain patterns having a thickness of 0.6 mm and a sheet of wooly nylon having a thickness of 0.2 mm (the total thickness of the skin material being 0.7 mm) was used.

According to the process described above by making reference to FIGS. 1 to 4, a box article having a length of 300 mm, a width of 250 mm and a height of 40 mm was produced from the laminated material consisting of the resin body layer having a thickness of 2.8 mm and the skin material layer having a thickness of 0.6 mm under the following conditions:

| Conditions for supplying the resin melt | |
|---|---|
| Resin temperature: | 240° C. |
| Mold temperature: | 35° C. |
| Cavity clearance during resin supply: | 13 mm |
| Mold closing rate: | 0 mm/sec. |
| (The mold closing being temporarily stopped) | |
| Cavity clearance on the completion of molding | |
| | 3.0 mm |

The skin material had no breakage or wrinkle, the grain patterns were well maintained, and the surface of the article had unchanged smoothness and luster.

COMPARATIVE EXAMPLE 2

In the same manner as in Example 2 but changing the cavity clearance during the resin supply to 113 mm (= C + 110 mm), the box article was produced.

The molded article had the uneven surface with small wrinkles.

EXAMPLE 3

As the body resin, polypropylene (Sumitomo Noblen (trade mark) AZ564, manufactured by Sumitomo Chemical Co., Ltd.) was used. As the skin material, a laminate of a polyvinyl chloride sheet with grain patterns having a thickness of 0.6 mm, a sheet of polyvinyl chloride foam having an expansion ratio of 8 and a thickness of 3 mm and a backing cloth of wooly polyester having a thickness of 0.2 mm (the total thickness of the skin material being 3.6 mm) was used.

According to the process described above by making reference to FIGS. 1 to 4, a box article having a length of 300 mm, a width of 250 mm and a height of 40 mm was produced from the laminated material consisting of the resin body layer having a thickness of 2.5 mm and the skin material layer having a thickness of 3.5 mm under the following conditions:

| Conditions for supplying the resin melt | |
|---|---|
| Resin temperature: | 200° C. |
| Mold temperature: | 35° C. |
| Cavity clearance: | |
| at the start of resin supply: | 53 mm |
| at the end of resin supply: | 13 mm |
| Mold closing rate: | 20 mm/sec. |
| Cavity clearance on the completion of molding | |
| | 3.0 mm |

The skin material had no breakage or wrinkle, the grain patterns were well reserved, and the surface of the article had unchanged smoothness.

EXAMPLE 4

As the body resin, polypropylene (Sumitomo Noblen (trade mark) AZ564, manufactured by Sumitomo Chemical Co., Ltd.) was used. As the skin material, a laminate of a polyvinyl chloride sheet with grain patterns having a thickness of 0.4 mm and a sheet of polypropylene foam having an expansion ratio of 25 and a thickness of 3.0 mm (the total thickness of the skin material being 3.2 mm) was used.

According to the process described above by making reference to FIGS. 1 to 4, a door trim shaped article having sizes of about 1,000 mm and about 600 mm and a thickness of 5.0 mm was produced from the laminated material consisting of the resin body layer having a thickness of 2.3 mm and the skin material layer having a thickness of 2.7 mm under the following conditions:

| Conditions for supplying the resin melt | |
|---|---|
| Resin temperature: | 200° C. |
| Mold temperature: | 10° C. |
| Cavity clearance: | |
| at the start of resin supply: | 62.5 mm |
| at the end of resin supply: | 32.5 mm |
| Mold closing rate: | 5 mm/sec. |
| Cavity clearance on the completion of molding | |
| | 2.5 mm |

The skin material had no breakage or wrinkle and suffered from little debossing, and the surface of the article was smooth.

What is claimed is:

1. A process for producing a multilayer molded article comprising a resin body and a skin material wherein said skin material is a member selected from the group consisting of woven fabric, non-woven fabric, thermoplastic resin films and elastomer films, which method comprises the steps of:
    (a) supplying the skin material between a male mold and a female mold which are attached to clamping means,
    (b) starting closing of the male and female molds, and supplying a resin melt for the resin body between the skin material and one of the male and female mold while, temporarily stopping the closing action of the mold when a cavity clearance between the molds is in a range of between (C + 100) mm and (C + 5) mm, wherein C is the cavity clearance when the molding is finished, and
    (c) further closing the molds to the cavity clearance of C to finish the molding, wherein the mold closing is restarted before the resin supply is finished, and to produce the multilayered molded article.

2. The process according to claim 1, wherein, in the step (b), the resin melt is supplied when the cavity clearance is in the range between (C + 100) mm and (C + 10) mm.

3. The process according to claim 1, wherein said resin melt comprises a thermoplastic resin selected from the group consisting of polypropylene, polyethylene, polystyrene, acrylonitrile-styrene-butadiene copolymer, and nylon.

4. The process according to claim 1, wherein said skin material is a member selected from the group consisting of polyolefins, polyvinyl chloride, polystyrene, and polyurethane.

5. The process according to claim 1, wherein the skin material is supported by setting pins in step (a).

6. The process according to claim 1, wherein the skin material is placed on a lower one of the male and female molds in step (a), and a shear clearance between the male and female molds is adjusted to about 0.1 to 1.0 mm.

7. A process for producing a multilayer molded article comprising a resin body and a skin material wherein said skin material is a member selected from the group consisting of woven fabric, non-woven fabric, thermoplastic resin films and elastomer films, which method comprises the steps of:

(a) supplying the skin material between a male mold and a female mold which are attached to clamping means, (b) starting closing of the male and female molds, and supplying a resin melt for the resin body between the skin material and one of the male and female molds while adjusting a closing rate at 30 mm/sec. when a cavity clearance between the molds is in a range of between (C + 100) mm and (C + 5) mm, wherein C is the cavity clearance when the molding is finished and wherein the resin melt is supplied while adjusting the mold closing rate in a range between 0.1 mm/sec. and 20 mm/sec., and the moment when the resin supply is finished, and to produce the multilayered molded article.

8. The process according to claim 7, wherein said resin melt comprises a thermoplastic resin selected from the group consisting of polypropylene, polyethylene, polystyrene, acrylonitrile-styrene-butadiene copolymer, and nylon.

9. The process according to claim 7, wherein said skin material is a member selected from the group consisting of polyolefins, polyvinyl chloride, polystyrene, and polyurethane.

10. The process according to claim 7, wherein, in the step (b), the resin melt is supplied when the cavity clearance is in the range between (C + 100) mm and (C + 10) mm.

11. The process according to claim 7, wherein the skin material is supported by setting pins in step (a).

12. The process according to claim 7, wherein the skin material is placed on a lower one of the male and female molds in step (a), and a shear clearance between the male and female molds is adjusted to about 0.1 to 1.0 mm.

* * * * *

UNITED STATES PATENT AND TRADEMARK OFFICE
CERTIFICATE OF CORRECTION

PATENT NO. : 5,154,872
DATED : October 13, 1992
INVENTOR(S) : Syohei Masui, Nobuhiro Usui, and Masahito Matsumoto It is certified that error appears in the above-identified patent and that said Letters Patent is hereby corrected as shown below:

Title page,
Item (75): Inventors:

Please change "Sorak" to --Kyoto--.

Signed and Sealed this

Twenty-second Day of February, 1994

Attest:

BRUCE LEHMAN

Attesting Officer     *Commissioner of Patents and Trademarks*

UNITED STATES PATENT AND TRADEMARK OFFICE
CERTIFICATE OF CORRECTION

PATENT NO. : 5,154,872

DATED : October 13, 1992

INVENTOR(S) : Syohei Masui, Nobuhiro Usui, and Masahito Matsumoto

It is certified that error appears in the above-indentified patent and that said Letters Patent is hereby corrected as shown below:

Column 7, line 22, claim 7, delete "while adjusting a closing rate at 30 mm/sec."

Column 8, line 3, claim 7, before "the" (first occurrence) insert as a new paragraph --(c) further closing the mold to the cavity clearance of C to finish the molding wherein the mold closing is restarted at--.

Signed and Sealed this

Twenty-fifth Day of October, 1994

Attest:

BRUCE LEHMAN

Attesting Officer

Commissioner of Patents and Trademarks